(12) United States Patent
Yamaki et al.

(10) Patent No.: US 8,757,715 B2
(45) Date of Patent: Jun. 24, 2014

(54) VEHICLE SEAT

(75) Inventors: Jogen Yamaki, Utsunomiya (JP);
Takashi Aoki, Kawachi-gun (JP);
Yukihiro Kunitake, Utsunomiya (JP);
Harutomi Nishide, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 13/376,490

(22) PCT Filed: Apr. 15, 2010

(86) PCT No.: PCT/JP2010/002733
§ 371 (c)(1),
(2), (4) Date: Dec. 6, 2011

(87) PCT Pub. No.: WO2010/150449
PCT Pub. Date: Dec. 29, 2010

(65) Prior Publication Data
US 2012/0091766 A1    Apr. 19, 2012

(30) Foreign Application Priority Data

Jun. 24, 2009 (JP) .................................. 2009-150020

(51) Int. Cl.
*B60R 21/20* (2011.01)
*B60R 21/207* (2006.01)

(52) U.S. Cl.
CPC .................................... *B60R 21/207* (2013.01)
USPC .................................... 297/216.13; 280/730.2

(58) Field of Classification Search
USPC ..................... 297/216.1, 216.13; 280/730.2
See application file for complete search history.

(56) References Cited

U.S. PATENT DOCUMENTS

| | | | | |
|---|---|---|---|---|
| 5,676,394 A | * | 10/1997 | Maly | 280/728.3 |
| 5,716,094 A | * | 2/1998 | Bhalsod et al. | 297/216.13 |
| 5,882,033 A | * | 3/1999 | Lachat | 280/728.3 |
| 6,254,122 B1 | * | 7/2001 | Wu et al. | 280/730.2 |
| 6,299,238 B1 | * | 10/2001 | Takagi et al. | 297/216.13 |
| 7,946,614 B2 | * | 5/2011 | Breuninger et al. | 280/730.2 |
| 8,033,602 B2 | * | 10/2011 | Yamaki et al. | 297/216.13 |
| 8,176,863 B2 | * | 5/2012 | Evans et al. | 297/216.1 |
| 2009/0008913 A1 | * | 1/2009 | Breuninger et al. | 297/216.1 |

FOREIGN PATENT DOCUMENTS

| | | | |
|---|---|---|---|
| JP | 07-267038 | | 10/1995 |
| JP | 08-156668 | * | 6/1996 |
| JP | 9-188215 | | 7/1997 |
| JP | 2001-219808 | | 8/2001 |
| JP | 2009-046112 | | 3/2009 |
| JP | 2009-096216 | | 5/2009 |

* cited by examiner

*Primary Examiner* — Peter Brown
(74) *Attorney, Agent, or Firm* — Rankin, Hill & Clark LLP

(57) ABSTRACT

A vehicle seat of the present invention includes: a seatback frame which has side frame sections on both sides thereof in a seat width direction; a load transmission member which projects toward an outside in the seat width direction from one of the side frame sections and transmits an impact load input from a side of a vehicle body to the seatback frame; and a side airbag device which is provided with an inflator which generates a gas when the impact load is input and a folded bag body to be deployed when the pressure of the gas is received. The inflator is attached to the load transmission member or the side frame section, and the bag body is disposed at a position which is further outside than a gas discharge port of the inflator in the seat width direction and is opposed to a surface facing the vehicle front side of the load transmission member.

11 Claims, 10 Drawing Sheets

VEHICLE SEAT

TECHNICAL FIELD

The present invention relates to a vehicle seat which has a side airbag device provided in a seatback.

Priority is claimed on Japanese Patent Application No. 2009-150020, filed Jun. 24, 2009, the content of which is incorporated herein by reference.

BACKGROUND ART

Patent Document 1 discloses a vehicle seat having a side airbag device which deploys a bag body between an occupant sitting on a seat and a side wall of a vehicle body when the vehicle body is subjected to an impact.

In this side airbag device, an inflator which generates a gas when a sensor detects an impact and a folded bag body which is deployed by receiving the gas pressure of this inflator are mounted as a module. The module is attached to a side frame section of a seatback frame.

In the vehicle seat described in Patent Document 1, the inflator and the bag body of the side airbag device are installed so as to be arranged in the vehicle body front-back direction on the outer surface in the width direction of the side frame section of the seatback frame. This folded bag body is disposed on the vehicle body front side of the inflator and is deployed to the vehicle body front side of the side frame section when an impact is input.

In addition, a vehicle seat is known which transmits an impact load which is input from a side wall of the vehicle body at the time of a collision of the vehicle at the side thereof to the vehicle body center via a framework section of the seat. Patent Document 2 discloses a vehicle seat having a load transmission member which is provided to project in a side frame section of a seatback frame and is brought into contact with a side wall of a vehicle body at the time of a collision of the vehicle at the side thereof in order to rapidly transmit an impact load input from the side wall of the vehicle body to the seat.

PRIOR ART DOCUMENT

Patent Documents

[Patent Document 1] Japanese Unexamined Patent Application, First Publication No. H07-267038
[Patent Document 2] Japanese Unexamined Patent Application, First Publication No. 2009-46112

SUMMARY OF INVENTION

Problems to be Solved by the Invention

However, a vehicle seat is being considered which has a load transmission member provided in a side frame section of a seatback frame and also has a side airbag device provided in the side frame section.

In this case, the load transmission member and the side airbag device are installed in the side frame section at approximately the same height. Therefore, when an inflator and a bag body of the side airbag device are installed so as to be arranged in the vehicle body front-back direction in a side surface of the side frame section as in the above-described conventional vehicle seat, problems occur in that the load transmission member and the side airbag device occupy a large amount of space in the vehicle body front-back direction of the seatback, and the entire size of the seat increases.

The present invention is contrived in view of the above-described circumstances, and an object of the present invention is to provide a vehicle seat which has a load transmission member and a side airbag device provided at the side of a seatback frame without increasing the entire size of the seat.

Means for Solving the Problem

The present invention employs the following measures to solve the problem and achieve the object related thereto.

(1) A vehicle seat of the present invention includes: a seatback frame which has side frame sections on both sides thereof in a seat width direction; a load transmission member which projects toward an outside in the seat width direction from one of the side frame sections and transmits an impact load input from a side of a vehicle body to the seatback frame; and a side airbag device which is provided with an inflator which generates a gas when the impact load is input and a folded bag body to be deployed when the pressure of the gas is received. The inflator is attached to the load transmission member or the side frame section, and the bag body is disposed at a position which is further outside than a gas discharge port of the inflator in the seat width direction and is opposed to a surface facing the vehicle front side of the load transmission member.

According to the vehicle seat described in (1), the inflator of the side airbag device is attached to the load transmission member or the side frame section. Furthermore, the bag body of the side airbag device is disposed at a position which is outside the gas discharge port of the inflator in the seat width direction and is opposed to a surface on the vehicle body front side of the load transmission member. Due to the above-described configuration, it is possible to install the load transmission member and the side airbag device in the side frame section so as to prevent the seat from occupying a large amount of space in the vehicle body front-back direction.

(2) In the vehicle seat according to (1), the inflator may be disposed at a position which is opposed to both of a surface facing the vehicle front side of a base section of the load transmission member and a surface facing the outside in the seat width direction of the side frame section.

In the case of the vehicle seat described in (2), the reaction force which is received when the bag body is deployed is supported by the load transmission member and the side frame section through the inflator. Therefore, it is possible to more rapidly deploy the bag body.

Advantage of the Invention

According to the present invention, it is possible to provide a vehicle seat which has a load transmission member and a side airbag device provided at the side of a seatback frame without increasing the entire size of the seat.

DESCRIPTION OF EMBODIMENTS

Figure 1:
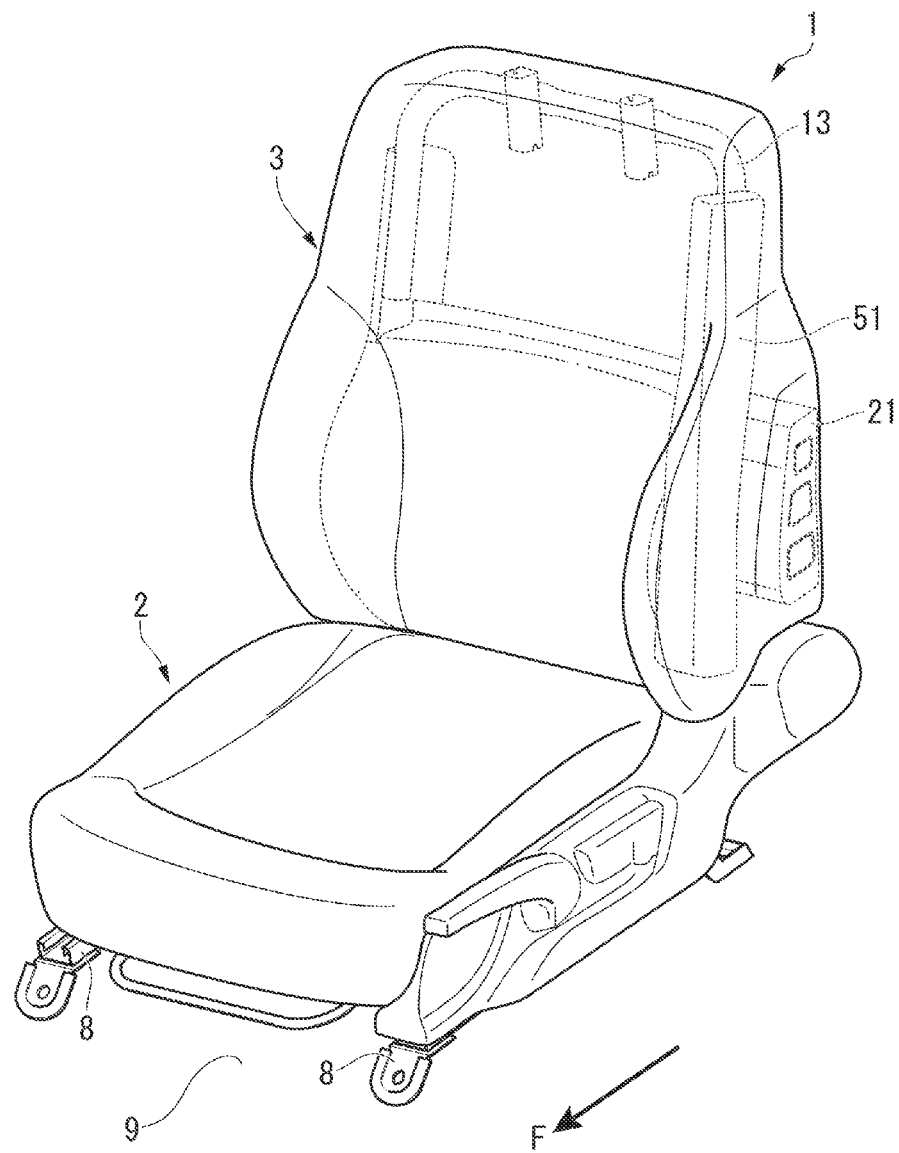
FIG. 1 is a perspective view of a vehicle seat according to the first embodiment of the present invention, providing an oblique view from above the front side of the vehicle body.

A vehicle seat according to a first embodiment of the present invention will be described as follows with reference to FIGS. 1 to 9. The arrow F in the drawings means the front of a vehicle.

Figure 2:
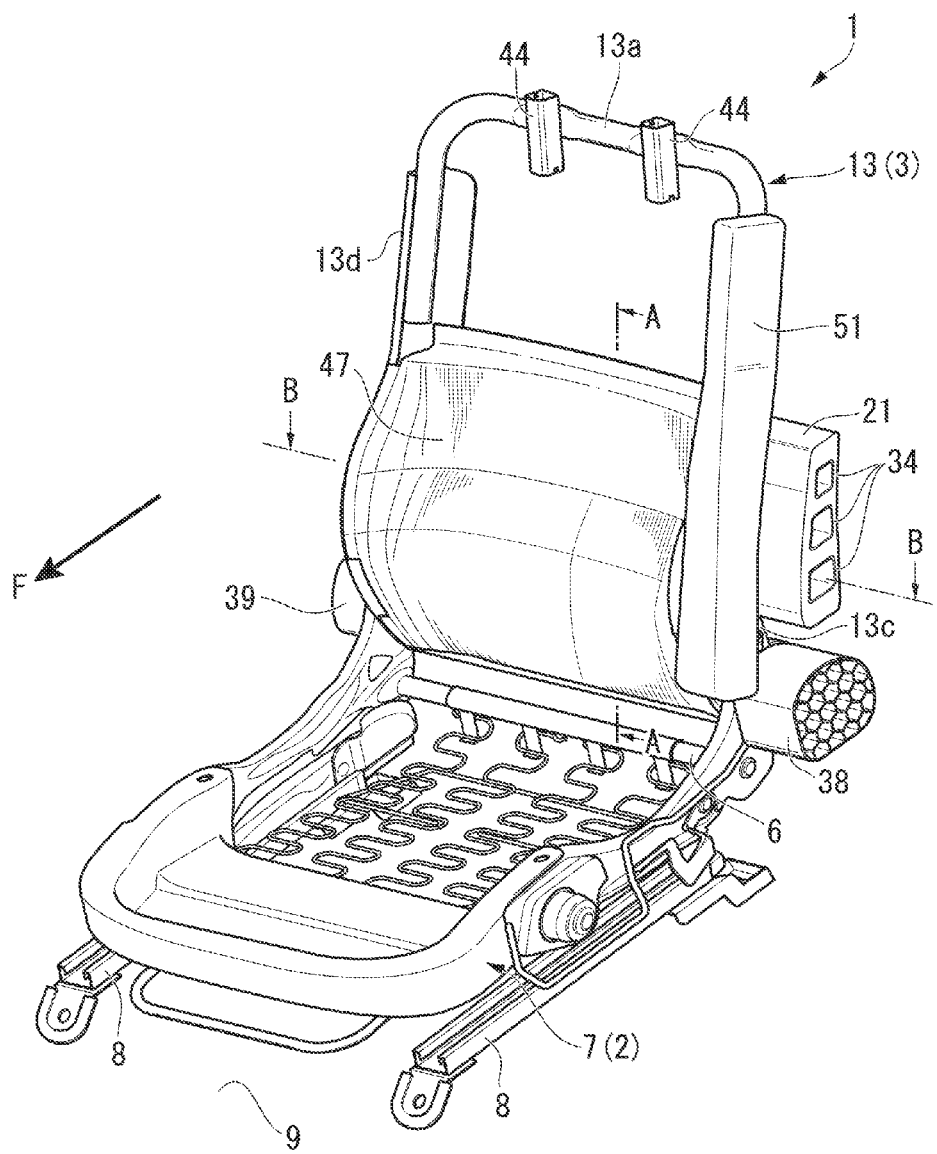
FIG. 2 is a perspective view of the framework section of the same vehicle seat, providing an oblique view from above the front side of the vehicle body.

FIG. 1 is a perspective view of a vehicle seat 1 which is installed on the front seat side of a vehicle, providing an oblique view from above the front side. FIG. 2 is a perspective view of the framework section of the vehicle seat 1, providing an oblique view from above the front side as above.

The vehicle seat 1 is provided with a seat cushion 2 which supports a hip portion of an occupant, a seatback 3 which is connected to the rear end section of this seat cushion 2 and supports waist and back portions of the occupant, and a head rest (not shown) which is supported in the upper section of this seatback 3 and supports head and neck portions of the occupant.

As shown in FIG. 2, the seat cushion 2 has a cushion frame 7 in which a rear cross member 6 extending in the vehicle width direction is attached to the rear end section. This cushion frame 7 is attached to a vehicle body floor 9 via seat rails 8 to be able to slide in the front-back direction.

Figure 3:
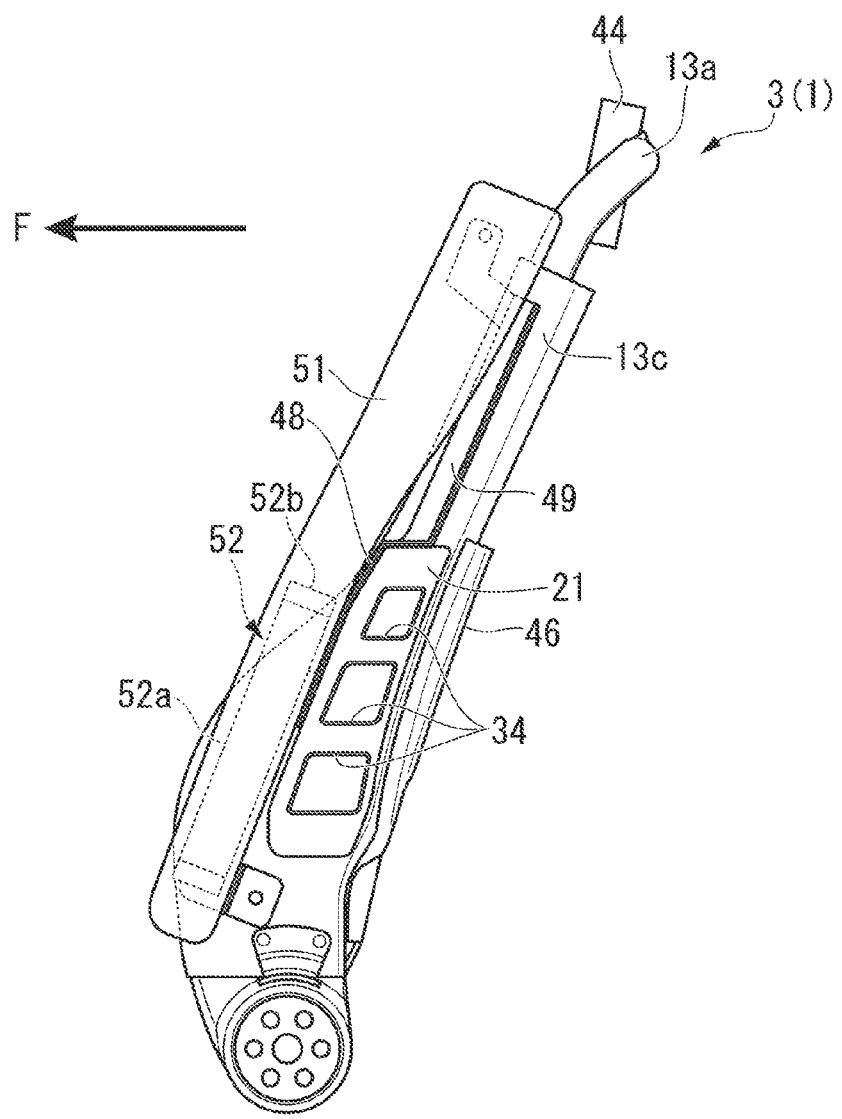
FIG. 3 is a side view of a framework section of the seatback of the same vehicle seat.
Figure 4:
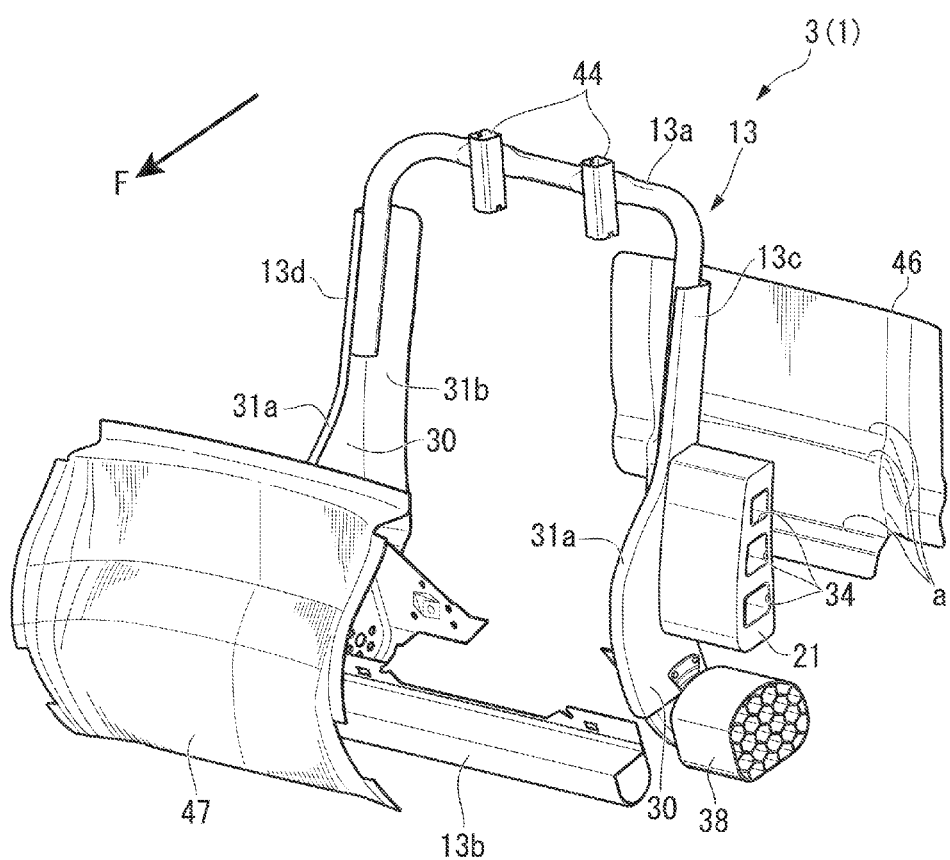
FIG. 4 is an exploded perspective view of the same framework section.
Figure 5:
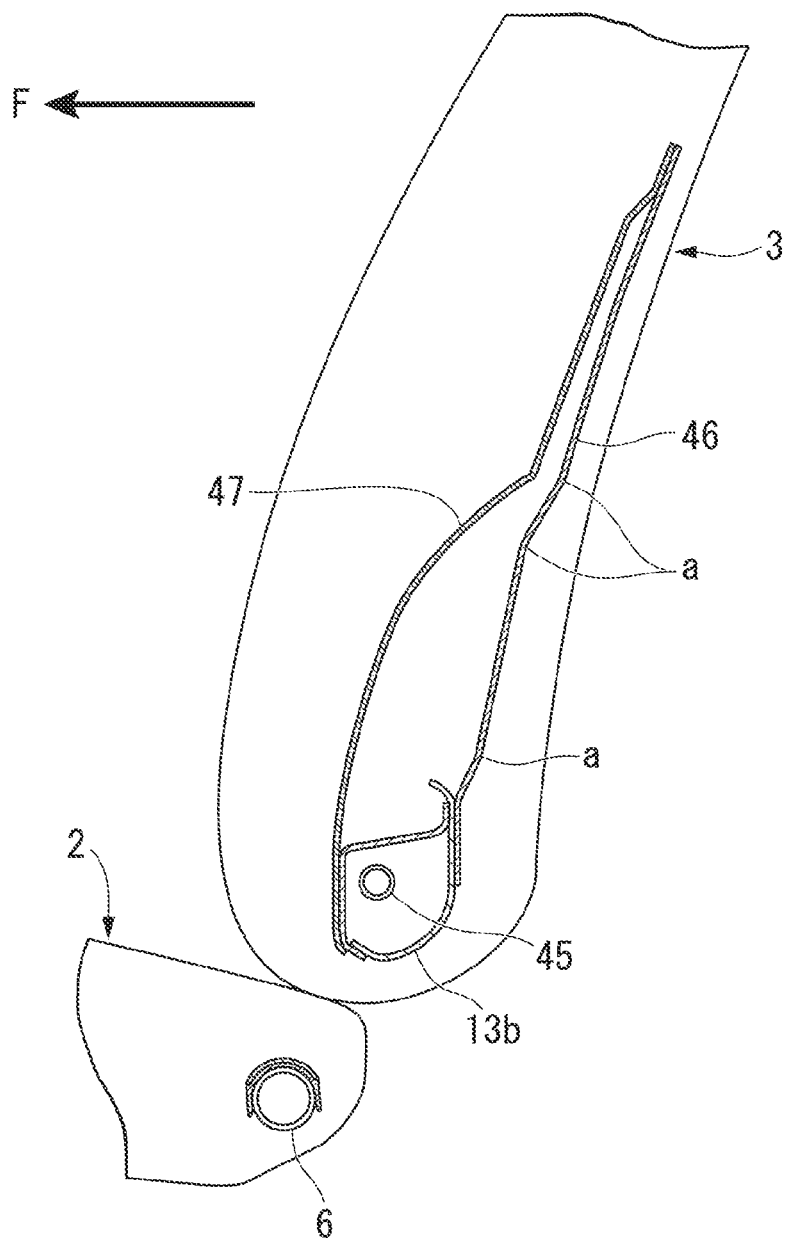
FIG. 5 is a partial cross-sectional view corresponding to a cross-section of the vehicle seat, taken along the line A-A of FIG. 2.
Figure 6:
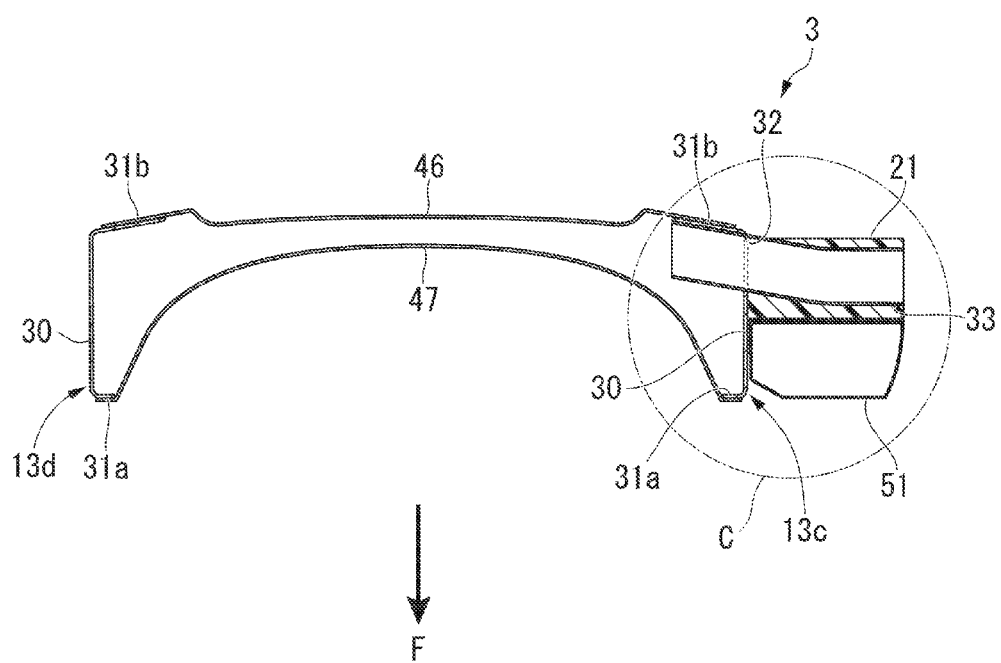
FIG. 6 is a cross-sectional view corresponding to a cross-section of the same vehicle seat, taken along the line B-B of FIG. 2.

FIGS. 3 and 4 are a side view and an exploded perspective view of a framework section of the seatback 3, respectively. FIGS. 5 and 6 are cross-sectional views of the framework section of the seatback 3.

As shown in FIGS. 2 to 6, the seatback 3 has a substantially rectangular frame-shaped seatback frame 13 formed of an upper frame section 13a, right and left side frame sections 13c and 13d and a lower frame section 13b. The lower end of this seatback frame 13 is connected to the rear end section of the cushion frame 7 so that it may be tilted.

The upper frame section 13a is formed of a substantially U-shaped pipe member. The head rest (not shown) is supported so that it may be moved up-and-down by support pipes 44, which are attached to the center of the upper side section extending in the seat width direction of this upper frame section 13a.

The right and left side frame sections 13c and 13d are formed of a panel member of which the cross-section in the horizontal direction is substantially U-shaped. These side frame sections 13c and 13d are formed so that the width in the front-back direction of an area which is disposed above the substantial center section in the vertical direction is narrower than the width in the front-back direction of an area which is disposed below the substantial center section. The upper areas, which have a narrow width in the front-back direction, of the side frame sections 13c and 13d are welded and fixed so that the U-shaped cross-sectional portion wraps around a corresponding side section of the upper frame section 13a from the outsides in the seat width direction. In addition, a hinge section (not shown) which is connected to the rear end section of the cushion frame 7 and a reclining mechanism (not shown) for adjusting the tilting angle of the seatback frame 13 are attached to the lower end sides of the side frame sections 13c and 13d. Furthermore, as shown in FIG. 5, the right and left reclining mechanisms are connected so as to interlock with each other by an operating rod 45 extending in the seat width direction.

In the lower frame section 13b, two curved plate members are joined to each other to form a substantial tube shape. This lower frame section 13b extends in the seat width direction so as to surround the operating rod 45, and both end sections thereof are connected to the lower ends of the right and left side frame sections 13c and 13d, respectively.

In the right and left side frame sections 13c and 13d, a front wall 31a and a rear wall 31b, which are bent toward the inside in the seat width direction, are continuously provided in front and rear of a side wall 30 facing the outside in the seat width direction, respectively. As described above, this side wall 30 part is formed so that the width of the section which is disposed above the substantial center section is narrower than the width of the section which is disposed below the substantial center section. Specifically, the side wall 30 is formed so that the entire area in the vertical direction at the rear end is substantially straight. At the vehicle body front end side of the side wall 30, the area from the upper side to the center in the vertical direction is formed to be substantially straight, and the area from the center to the lower side is curved to gradually swell forward toward the lower side. Accordingly, the front walls 31a of the side frame sections 13a and 13d are provided with a curved surface following the curved shape of the front end of the side wall 30.

A corrugated plate-shaped back plate 46 having ridge sections a running in the seat width direction, is disposed behind the space between the side frame sections 13c and 13d. Both side edge sections of the back plate 46 are welded and fixed to the back surfaces of the rear walls 31b of the side frame sections 13c and 13d. The back plate 46 is disposed to cover the range from the lower ends of the side frame sections 13c and 13d to the substantial intermediate height in the vertical direction. The lower edge section of the back plate 46 is welded and fixed to the back surface of the lower frame section 13b.

In addition, a back pan 47 formed of a three-dimensionally curved plate member is disposed on the front section side between the side frame sections 13c and 13d. Both of the side edge sections of the back pan 47 are welded and fixed to the front surfaces of the front walls 31a of the side frame sections 13c and 13d. The upper area of the back pan 47 which is curved towards the rear side bridges between the right and left side frame sections 13c and 13d, and is welded and fixed to the upper edge section of the back plate 46. The lower edge section of the back pan 47 is welded and fixed to the front surface of the lower frame section 13.

As shown in FIG. 6, the cross-section in the horizontal direction of the back pan 47 is formed to be curved in a concave shape so that the center in the seat width direction is depressed toward the rear side of the vehicle body. Furthermore, as shown in FIG. 5, the cross-section in the vertical direction of the back pan 47 is formed to be curved in a convex shape so that the section which is disposed below the substantial center section in the vertical direction is protruded forward toward the lower end side.

Together, the lower frame section 13b, the back pan 47 and the back plate 46 form a closed cross-section extending in the seat width direction between both of the side frame sections 13c and 13d, and contribute to the load transmission between the side frame sections 13c and 13d.

Figure 7:
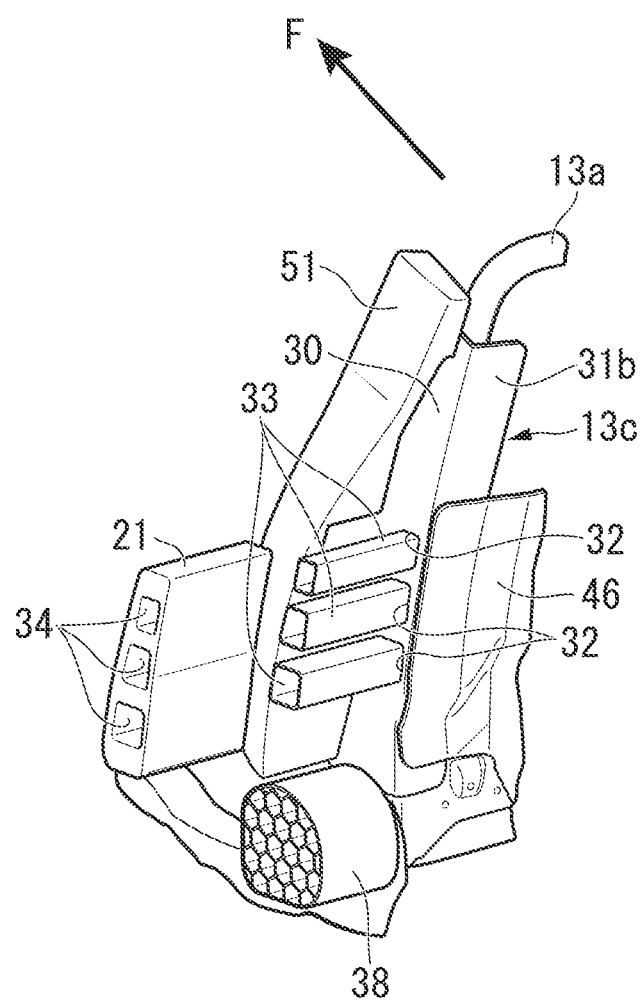
FIG. 7 is a partial exploded perspective view of the framework section of the same vehicle seat, providing an oblique view from above the rear side of the vehicle body.
Figure 8:
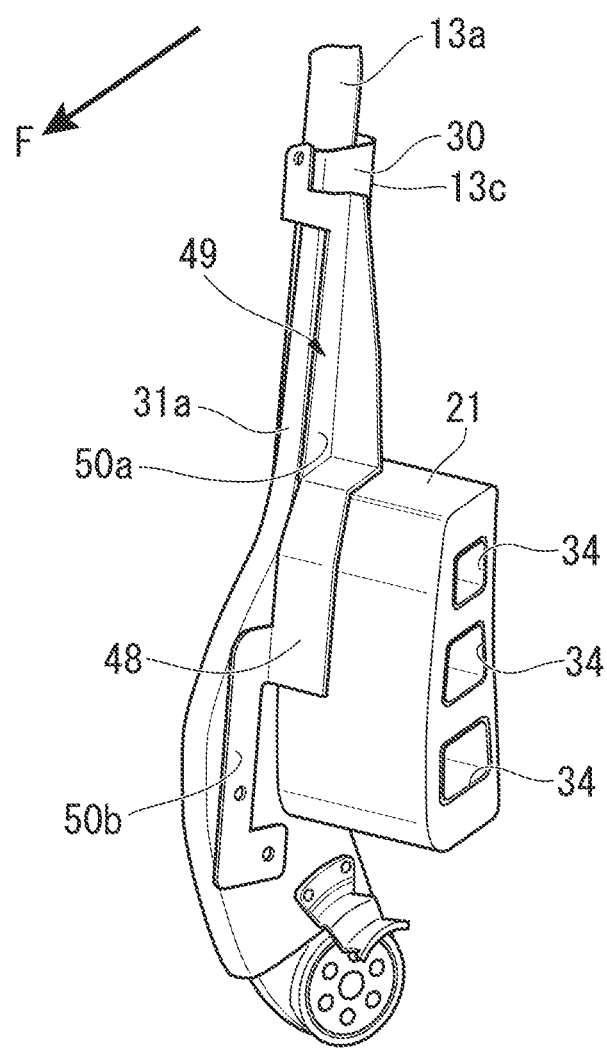
FIG. 8 is a partial perspective view of the same framework section, providing an oblique view from above the front side of the vehicle body.
Figure 9:
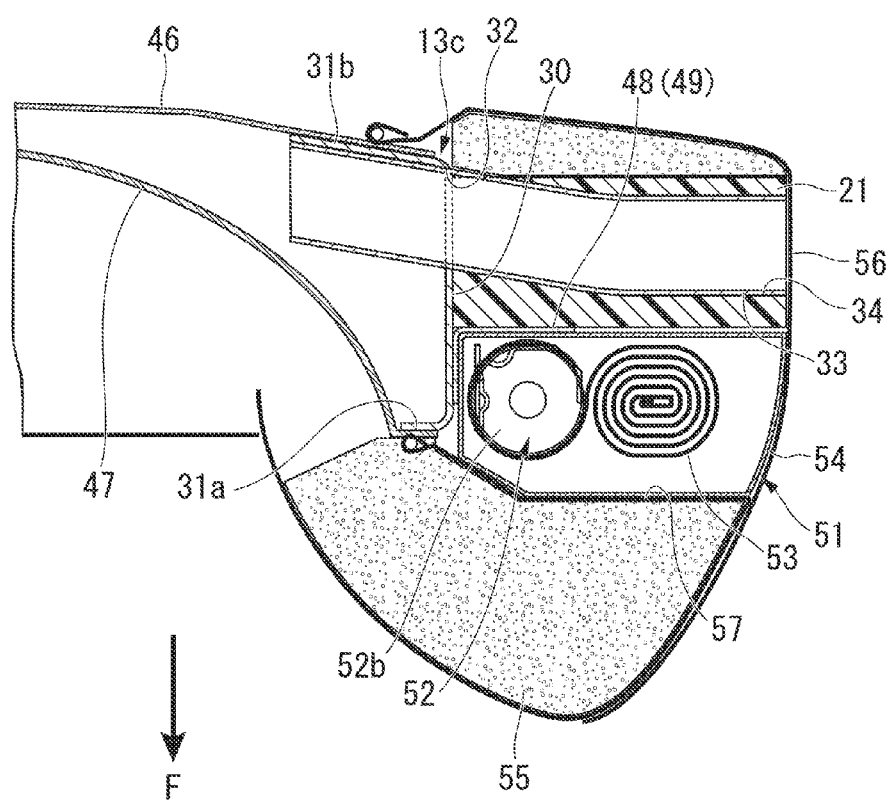
FIG. 9 is a partial cross-sectional view corresponding to the part C of FIG. 6 of the vehicle seat.

FIGS. 7 and 8 are perspective views showing a state in which components are mounted on the side frame section 13c which is on the outside in the vehicle width direction. FIG. 9 is a cross-sectional view of the vehicle seat 1 corresponding to the part C of FIG. 6.

The side wall 30 facing the outside in the vehicle width direction of the side frame section 13c is provided with three through-holes 32 which have a substantially rectangular shape and are provided to be arranged in the vertical direction. Square tube-shaped guide pipes 33 are fixed by fitting to these through-holes 32, respectively. These three through-holes 32 are provided in an area which is biased to the rear side of the vehicle body at the substantial center in the vertical direction of the side wall 30. The rear wall 31b extends toward the inside in the vehicle width direction from the rear end of the side wall 30 of the side frame section 13c. A base end section of each guide pipe 33 fitted into the through-hole 32 is welded and fixed to this rear wall 31b. Specifically, the base end section of the guide pipe 33 is welded and fixed to the rear wall 31b in a state in which the flat rear portion wall overlaps the front surface of the rear wall 31b of the side frame section 13c. A load transmission block 21 is fixed by fitting to the three guide pipes 33 projecting toward the outside in the vehicle width direction from the side wall 30.

The load transmission block 21 is a member which transmits an impact load, which is input to the side wall of the vehicle body at the time of a collision of the vehicle at the side thereof, to the side frame section 13c. This load transmission block 21 has a honeycomb structure in which a plurality of tube-shaped cross-sections extending in the vehicle width direction are arranged in parallel, and is made of a resin in a rectangular parallelepiped shape which is long in the vertical direction. In addition, the load transmission block 21 is provided with a plurality of fitting holes 34 in which the guide pipes 33 projecting in the side frame section 13c are fitted. In a state in which the guide pipes 33 are fitted in these fitting holes 34, the upper and lower end sections at the root side of the load transmission block 21 are fastened and fixed to the side frame section 13c by a bolt. The load transmission block 21 fastened and fixed in this manner projects at a position which is biased to the rear side with respect to the center in the front-back direction of the side wall 30. In this embodiment, the guide pipe 33 and the load transmission block 21 constitute a load transmission member.

As shown in FIG. 8, a support plate 49 made of metal is attached to the side wall 30 of the side frame section 13c. This support plate 49 is provided with an L-shaped support wall 48 coming into contact with the front and upper surfaces at the base section side (adjacent to the side frame section 13c) of the load transmission block 21. In addition, the support plate 49 is provided with an upper fixing wall 50a and a lower fixing wall 50b. At the upper side of the support wall 48, the upper fixing wall 50a is fastened to the side wall 30 of the side frame section 13c by a bolt. At the lower front side of the support plate 48, the lower fixing wall 50b is fastened to the side wall 30 of the side frame section 13c by a bolt.

A side airbag device 51 for protecting an occupant is fixed to the support plate 49 and the side wall 30 of the side frame section 13c.

As shown in FIG. 9, the side airbag device 51 is provided with an inflator 52 which generates a gas upon detection of an impact and a folded bag body 53 which is deployed by receiving the gas pressure of the inflator 52. In a state in which these are accommodated in a bag case 54 provided with an openable lid section, the side airbag device 51 is attached to the side frame section 13c.

As shown in FIG. 3, the inflator 52 is provided with a cylindrical main body section 52a and a gas discharge port 52b. The main body section 52a is attached to the side frame section 13c along the longitudinal direction of the side frame section 13c. In this state, the inflator 52 is disposed at a position opposed to the side wall 30 of the side frame section 13c and the front surface of the support wall 48 (load transmission block 21) of the support plate 49.

The bag body 53 is disposed at a position which is outside the gas discharge port 52b of the inflator 52 in the seat width direction and opposed to the front surface of the support wall 48 (load transmission block 21) of the support plate 49. In addition, the bag body 53 is folded to be wound multiple times in a roll shape in the direction of the inflator 52 toward the root side from the tip end side. Accordingly, when receiving the gas pressure from the inflator 52, the bag body 53 is smoothly deployed toward the outside in the vehicle width direction and the front side of the vehicle body while the winding is released from the root side. At this time, since the bag body 53 is opposed to the front surface of the load transmission block 21, the deployment direction is regulated to the vehicle forward direction by the front surface of the load transmission block 21. As a result, the bag body 53 is deployed forward along the side wall of the vehicle body such as a center pillar and a door lining (not shown).

As shown in FIG. 9, a pad member 55 is disposed around the seatback frame 13, the load transmission block 21 and the side airbag device 51. An epidermal member 56 covers the outer surface of the pad member 55. In this embodiment, the pad member 55 is provided with a slit-shaped opening 57 which is opened toward the outside in the vehicle width direction, and in this opening 57, the load transmission block 21 and the side airbag device 51 are disposed. When a gas is supplied to the bag body 53 from the inflator 52 at the time of a collision at the side thereof, the bag body 53 protrudes outward from the opening 57 and breaks the epidermal member 56 at the side of the seatback 3 to be deployed forward.

In addition, as shown in FIG. 9, the side airbag device 51 is set so as to be positioned inward of the end section (tip end section of the load transmission block 21) on the outside in the seat width direction of the vehicle seat 1. Accordingly, it is possible to secure a space in an area on the front side of the load transmission block 21 and on the outside in the seat width direction.

In addition, as shown in FIG. 2, load transmission blocks 38 and 39 are attached to the outside (outside in the seat width direction) of the reclining mechanisms (not shown) at the lower ends of the right and left side frame sections 13c and 13d, respectively. These load transmission blocks 38 and 39 have a honeycomb structure in which a plurality of tube-shaped cross-sections extending in the vehicle width direction are arranged in parallel as in the load transmission block 21 on the upper side. In addition, the load transmission block 39 which is attached to the side frame section 13d on the inside in the vehicle width direction is opposed to a side surface of a console box (not shown) at the center in the vehicle width direction.

In the above-described configuration, when an impact load is input to the side of a vehicle body at the time of a collision of the vehicle at the side thereof, a sensor detects the impact and the inflator 52 of the side airbag device 51 generates a gas. The gas generated by the inflator 52 is supplied to the bag body 53. The bag body 53 breaks the epidermal member 56 at the side of the seat and swells forward from the side of the seat 1. Therefore, the bag body 53 is deployed between an occupant sitting on the seat 1 and the side wall of the vehicle body.

When the side wall of the vehicle body such as a center pillar is deformed in the direction of the seatback 3 at the time of a collision of the vehicle at the side thereof, the side wall is brought into contact with the load transmission blocks 21 and 38 at the side of the vehicle seat 1, and the load is input to these blocks. When the load is input to the lower load transmission block 38, the entire seat moves toward the inside in the vehicle width direction, and the lower load transmission block 39 on the inside in the vehicle width direction is brought into contact with the console box. At this time, the load is transmitted to a floor tunnel from the lower frame section 13b of the seatback frame 13 via the load transmission block 39 and the console box.

In addition, when the impact load is input to the upper load transmission block 21, the load is transmitted from the immediate lateral side to the side frame section 13c on the outside in the width direction of the seatback frame 13 from the load transmission block 21. The load transmitted to the side frame section 13c is transmitted to the side frame section 13d on the inside in the width direction via the tube-shaped structure including the back pan 47 and the back plate 46 and the upper and lower frame sections 13a and 13b. The load transmitted to the side frame section 13d is further transmitted to the floor tunnel via the load transmission block 39 and the console box.

The surface of the back plate 46 is divided into a plurality of areas by the ridge sections a extending in the seat width direction. Therefore, when a load is input to one end in the seat width direction of the back plate 46, a stress in a shear direction is generated in the plurality of divided areas. Accordingly, the input impact load is received in almost the entire area of the back plate 46, and is thus transmitted to the side frame section 13d on the inside while being dispersed to the entire area of the back plate 46.

As described above, in this vehicle seat 1, the inflator 52 of the side airbag device 51 is connected to the side frame section 13c of the seatback frame 13. The bag body 53 is disposed at a position which is outside the gas discharge port 52b of the inflator 52 in the seat width direction and is opposed to the front surface of the load transmission block 21. Accordingly, the side airbag device 51 having a narrow width in the front-back direction is installed in the side frame section 13c so as to be arranged with the load transmission block 21 in the front-back direction. Accordingly, it is possible to install the side airbag device 51 and the load transmission block 21 on the same side frame section 13c without causing an increase in the size of the vehicle seat 1.

In addition, in this vehicle seat 1, the bag body 53 is disposed at a position which is outside the gas discharge port 52b of the inflator 52 in the seat width direction and is opposed to the front surface of the load transmission block 21. Accordingly, the reaction force which is received when the bag body 53 is deployed is securely received by the load transmission block 21 and the inflator 52 connected to the side frame section 13c.

In addition, in this vehicle seat 1, the inflator 52 is disposed at a position which is opposed to the front surface at the base section side of the load transmission block 21 and the outer surface of the side wall 30 of the side frame section 13c. Accordingly, the reaction force which is received when the bag body 53 is deployed is strongly supported by the load transmission block 21 and the side frame section 13c through the inflator 52. Therefore, the bag body 53 is more rapidly deployed.

Particularly, in the vehicle seat 1 of this embodiment, the support plate 49 made of metal is connected to the side frame section 13c by a bolt. The support plate 49 is provided with the substantially L-shaped support wall 48 coming into contact with the front and upper surfaces of the load transmission block 21. The inflator 52 of the side airbag device 51 is supported by the load transmission block 21 via the support wall 48 of the support plate 49. Due to the above-described configuration, the inflator 52 can more strongly support the reaction force.

Figure 10:
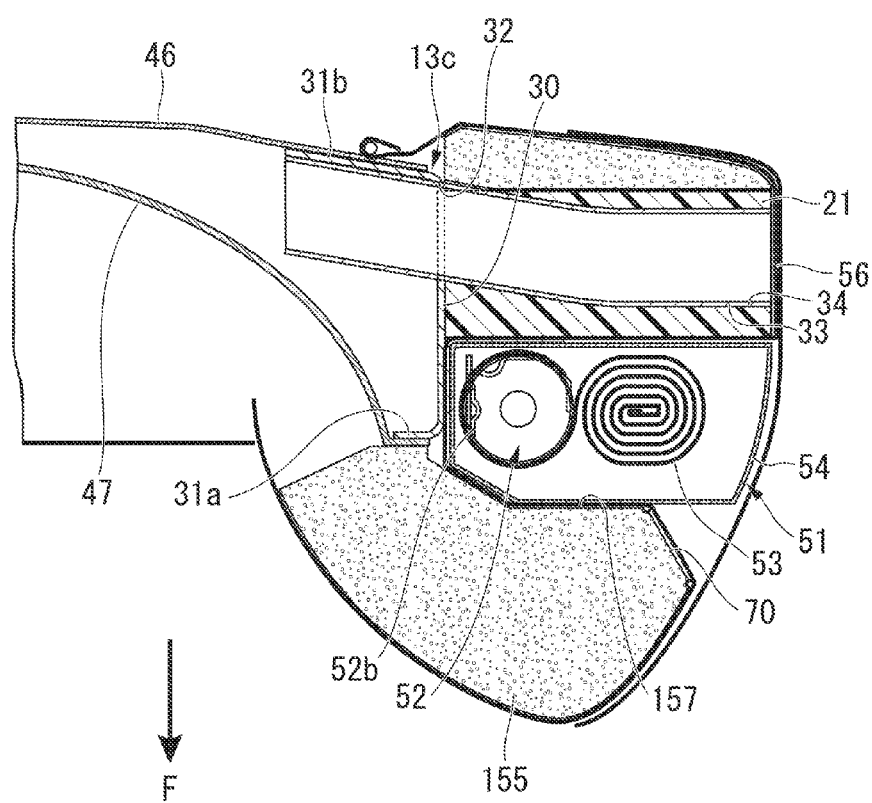
FIG. 10 is a partial cross-sectional view according to a vehicle seat of a second embodiment of the present invention, corresponding to FIG. 9.

The present invention is not limited only to the above-described embodiments, and various design changes can be made without departing from the range of the gist of the present invention. For example, the above-described first embodiment has a configuration in which the pad member 55 at the side of the vehicle seat 1 has the slit-shaped opening 57 formed therein, and the side airbag device 51 and the load transmission block 21 are disposed in the opening 57. In place of this configuration, as in a second embodiment shown in FIG. 10, a configuration may be employed in which a tapered surface 70 is provided at the edge section on the outside in the seat width direction of an opening 157 of a pad member 155 so as to expand the width of the opening forward. In this case, since the width of the opening 157 is expanded forward in a tapered shape, it is difficult for a bag body 53 to be brought into contact with the inner wall of the opening 157 when the bag body 53 is deployed. Accordingly, the bag body 53 can be deployed more smoothly forward.

In addition, for example, in the above-described first embodiment, the inflator 52 of the side airbag device 51 is connected to the side frame section 13c of the seatback frame 13. However, the inflator 52 may be connected to the load transmission block 21.

INDUSTRIAL APPLICABILITY

According to the present invention, it is possible to provide a vehicle seat which has a load transmission member and a side airbag device provided in a side section of a seatback frame without an increase in the entire size of the seat.

DESCRIPTION OF THE REFERENCE SYMBOLS

1: VEHICLE SEAT
13: SEATBACK FRAME
13c: SIDE FRAME SECTION
13d: SIDE FRAME SECTION
21: LOAD TRANSMISSION BLOCK (LOAD TRANSMISSION MEMBER)
33: GUIDE PIPE (LOAD TRANSMISSION MEMBER)
51: SIDE AIRBAG DEVICE
52: INFLATOR
52b: GAS DISCHARGE PORT
53: BAG BODY

The invention claimed is:
1. A vehicle seat, comprising:
a seatback frame which has side frame sections on both sides thereof in a seat width direction, each of the side frame sections having a side wall that faces laterally outwardly in the seat width direction;
a load transmission member which projects laterally outwardly in the seat width direction from one of the side frame sections and transmits an impact load input from a side of a vehicle body to the seatback frame, the load transmission member having a surface that faces a vehicle front side, and projecting from the side frame section such that a corner is defined between the side wall of said one of the side frame sections from which the load transmission member projects and the surface of the load transmission member that faces a vehicle front side; and a side airbag device which is provided with an inflator which generates gas when the impact load is input, and a folded bag body to be deployed when the pressure of the gas is received, wherein the inflator is attached to the side wall of said one of the side frame sections at a position that is laterally outward from the side wall of said one of the side frame sections and forward from the surface of the load transmission member that faces the vehicle front side in a seat front-back direction, so that the inflator is disposed at said corner to oppose the side wall of said one of the side frame sections and the surface of the load transmission member that faces the vehicle front side, and the bag body is disposed at a position which is laterally outward from a gas discharge port of the inflator in the seat width direction, and at a position that is forward from the surface of the load transmission member that faces the vehicle front side in the seat front-back direction, so that the bag body opposes the second surface of the load transmission member.

2. The vehicle seat according to claim 1,
wherein said one of the side frame sections is a side frame section of the seatback frame that is disposed nearest to a lateral outer surface of the vehicle body, the load transmission member projects laterally outwardly from said one of the side frame sections toward said lateral outer surface of the vehicle body, and the bag body is disposed laterally outwardly from the gas discharge port of the inflator so as to be disposed between the gas discharge port of the inflator and said lateral outer surface of the vehicle.

3. The vehicle seat according to claim 1,
wherein said surface of the load transmission member that faces the vehicle front side is a planar surface.

4. The vehicle seat according to claim 3,
wherein said surface of said one of the side frame sections that faces laterally outwardly in the seat width direction is a planar surface.

5. The vehicle seat according to claim 1,
wherein the inflator is directly attached to the side wall of said one of the side frame sections.

6. A vehicle seat, comprising:
a seatback frame which has side frame sections on both sides thereof in a seat width direction;
a load transmission member which projects laterally outwardly in the seat width direction from one of the side frame sections and transmits an impact load input from a side of a vehicle body to the seatback frame, the load transmission member having a surface that faces a vehicle front side;
a side airbag device which is provided with an inflator which generates gas when the impact load is input, and a folded bag body to be deployed when the pressure of the gas is received; and
a pad member disposed around the seatback frame, the load transmission member, and the side airbag device, the pad member defining an opening facing laterally outwardly in the seat width direction, and a portion of the pad member that defines a forward edge section of the opening in the seat front-back direction is formed as a tapered surface that expands the opening in the seat front-back direction, wherein
the side airbag device and the load transmission member are disposed in the opening defined in the pad member,
the inflator is attached to the load transmission member or the side frame section,
the bag body is disposed at a position which is laterally outward from a gas discharge port of the inflator in the seat width direction, and at a position that is forward from the surface of the load transmission member that faces the vehicle front side in a seat front-back direction, so that the bag body opposes the surface of the load transmission member that faces the vehicle front side, and
when deployed, the bag body protrudes laterally outwardly in the seat width direction and forward in the seat front-back direction from the opening of the pad member.

7. The vehicle seat according to claim 6,
wherein the inflator is disposed at a position which is opposed to both of the surface of the load transmission member facing the vehicle front side and a surface of the side frame section facing laterally outwardly in the seat width direction.

8. The vehicle seat according to claim 7,
wherein said surface of the load transmission member that faces the vehicle front side is a planar surface, and
wherein said surface of the side frame section that faces laterally outwardly in the seat width direction is a planar surface.

9. The vehicle seat according to claim 6,
wherein said one of the side frame sections from which the load transmission member projects laterally outwardly in the seat width direction is a side frame section of the seatback frame that is disposed nearest to a lateral outer surface of the vehicle body, the load transmission member projects laterally outwardly from said one of the side frame sections toward said lateral outer surface of the vehicle body, the bag body is disposed laterally outwardly from the gas discharge port of the inflator so as to be disposed between the gas discharge port of the inflator and said lateral outer surface of the vehicle, the opening defined in the pad member faces said lateral outer surface of the vehicle, and when deployed, the bag body protrudes laterally outwardly in the seat width direction from the opening defined in the pad member toward said lateral outer surface of the vehicle.

10. The vehicle seat according to claim 6,
wherein said surface of the load transmission member that faces the vehicle front side is a planar surface.

11. The vehicle seat according to claim 6,
wherein the inflator is directly attached to the side wall of said one of the side frame sections.

* * * * *